O. NELSON.
SHELL FISH TRAP.
APPLICATION FILED MAY 25, 1917.
1,241,426.
Patented Sept. 25, 1917.
2 SHEETS—SHEET 1.
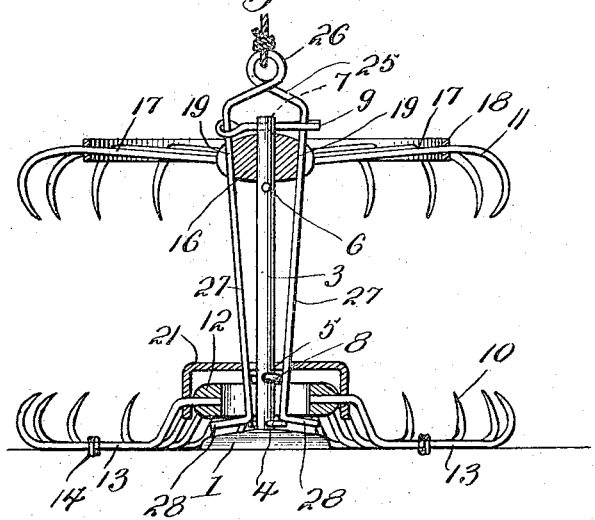
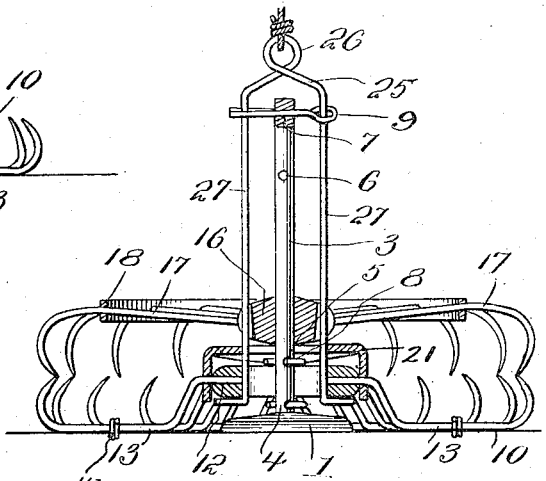
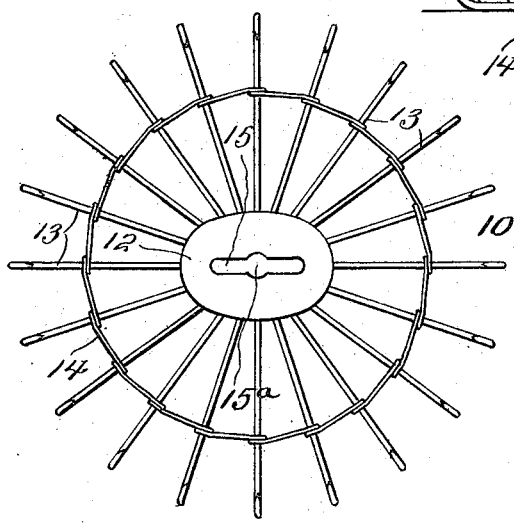
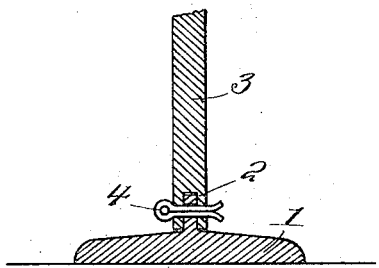
WITNESSES
INVENTOR
Oscar Nelson
BY Victor J. Evans
ATTORNEY O. NELSON.
SHELL FISH TRAP.
APPLICATION FILED MAY 25, 1917.
Patented Sept. 25, 1917.
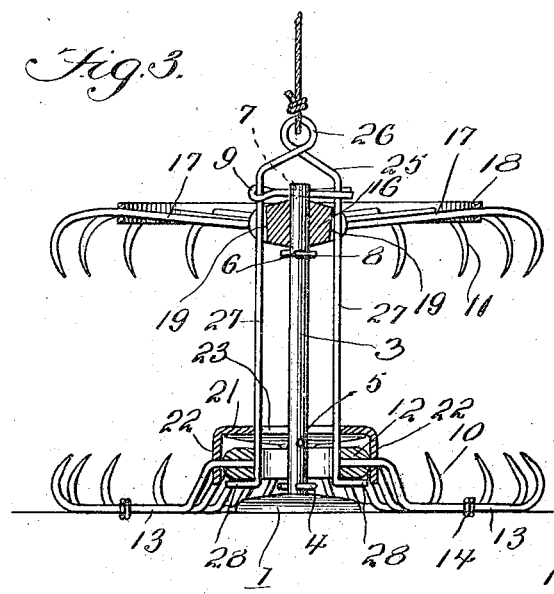
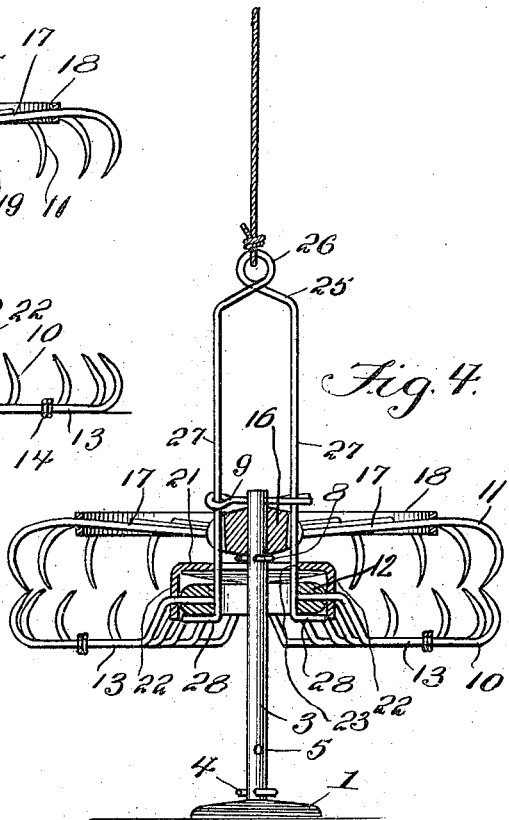
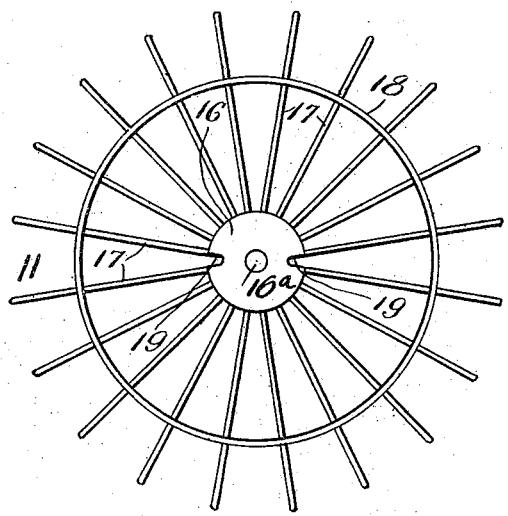
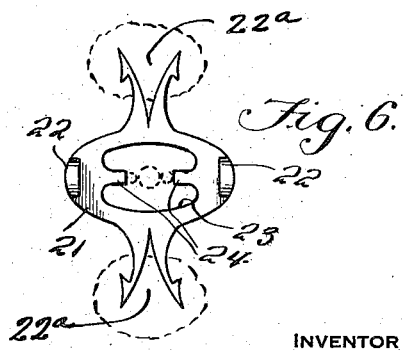
INVENTOR
Oscar Nelson
BY Victor J. Evans
ATTORNEY

UNITED STATES PATENT OFFICE.

OSCAR NELSON, OF LONG BEACH, CALIFORNIA.

SHELL-FISH TRAP.

1,241,426.  Specification of Letters Patent.  Patented Sept. 25, 1917.

Application filed May 25, 1917.  Serial No. 170,806.

*To all whom it may concern:*

Be it known that I, OSCAR NELSON, a citizen of Sweden, residing at Long Beach, in the county of Los Angeles and State of California, have invented new and useful Improvements in Shell-Fish Traps, of which the following is a specification.

This invention is an improved trap for catching shell fish and the like, the object of the invention being to provide an improved trap of this character which may be used either as a set trap or as a snag and which is simple in construction and thoroughly efficient in operation.

The invention consists in the construction, combination and arrangement of devices, hereinafter described and claimed.

In the accompanying drawings:—

Figure 1 is an elevation, partly in section of a shell fish trap constructed and arranged in accordance with my invention and as arranged for use as a set trap and open.

Fig. 2 is a similar view of the same, closed.

Fig. 3 is a similar view of the trap as arranged for use as a snag, and open.

Fig. 4 is a similar view of the same closed.

Fig. 5 is a detailed plan of the upper member.

Fig. 6 is a similar view of the trigger and bait holder.

Fig. 7 is a similar view of the lower member.

Fig. 8 is a detailed sectional view of the base and standard.

In the embodiment of my invention I provide a base 1 which is preferably circular and of suitable width and from the center of which rises a stud 2. Standard 3 is a pipe and its lower end is to receive the stud and said standard is secured to the stud and hence to the base by a pin 4 which passes transversely through openings in the stud and standard, the said pin being here shown as a cotter pin. The standard is provided at a suitable distance from its lower end with an opening 5 and is also provided with spaced openings 6, 7 at suitable distances from its upper end.

A cotter pin 8 is provided for insertion in either of the openings 5, 6 and a cotter pin 9 is provided for insertion in the opening 7.

I also provide lower and upper members 10, 11 which are arranged for vertical sliding movement on the standard 3. The lower member comprises a hub 12 which is here shown as oval in form and radially arranged hook arms 13 the points of which are upturned as shown. These hook arms are connected to and strengthened by a band 14 which is arranged a suitable distance from their outer ends and is concentric with the standard. The hub 12 is provided with a longitudinal vertical slot 15 which is widened at the center to form an opening $15^a$ through which the standard extends, the member 10 being hence adapted to slide vertically on the standard when the trap is used as a snag. The member 11 comprises a circular hub 16 the diameter of which is less than the length of the hub 12, and radially arranged hook arms 17 the points of which are down-turned. A band 18 is also employed to strengthen said hook arms 17. In opposite sides of the hub 16 are guide grooves 19. The hub has a central opening $16^a$ through which the standard passes.

A trigger and bait holder 21 is also provided and is here shown as an oval disk provided at the ends with down-turned arms 22 which are pivotally mounted on two of the hook arms 13 at the ends of the hub 12 of the lower member. Two pairs of outwardly diverging bait holding hooks $22^a$ project from opposite sides of the bait holder and trigger and said bait holder and trigger is provided with a substantially oval opening 23 and with a pair of arms 24 which extend toward each other from opposite ends of said opening and are suitably spaced apart, as shown in detail in Fig. 6.

A spring yoke 25 is also provided, which is of inverted U-shape, and is preferably made of spring wire of suitable gage and has an eye 26 at the upper end for the attachment of a line, the arms 27 of the yoke being guided by the upper cotter pin 9 and extending down through the guide grooves 19 of the hub of the upper member, the opening 23 of the trigger and bait holder and the slot 15 of the hub of the lower member and having their lower ends out-turned as at 28 to engage under the last-named hub.

When the trap is to be used as a set trap the pin 8 is removed from the opening 6 and placed in the opening 5 of the standard so that the lower hub is held between said pin 8 and pin 4 against vertical movement and the upper hub is enabled to slide vertically on the standard. In order to set the trap the upper member is raised as shown in Fig.

1 with the arms of the spring yoke engaged in the guide grooves 19 of its hub and the lower ends of the arms of the spring yoke are pressed toward each other and the trigger is arranged in vertical position and caused to engage its arms 24 on the outer sides of the arms of the spring yoke, as shown in dotted lines in Fig. 6, and to thus hold said arms of the spring yoke in such position, as shown in Fig. 1. By thus holding the arms of the spring yoke with their lower ends pressed inwardly said arms are caused to bind against opposite sides of the hub of the upper member, in the lower parts of the guide grooves 19 and to hold said upper member in raised, open position, shown in Fig. 1.

When a shell fish is attracted by the bait the movements of the fish cause the trigger and bait holder to be tilted in one direction or the other so that its arms 24 disengage the arms of the spring yoke and thereupon the arms of the spring yoke move outwardly in opposite direction, release the hub of the upper member and said upper member drops by its own weight and hence the shell fish is caught between yokes of the upper and lower members and held.

To use the trap as a snag the cotter pin 8 is placed in the opening 6 instead of the opening 5 after having first raised the upper member, so that the upper member is held by said cotter pin in raised position on the standard and the lower member is permitted to slide vertically with relation to the standard. The yoke is disengaged by the trigger, the trigger not being used excepting for holding the bait while the trap is used as a snag. Hence the arms of the spring yoke remain in normal substantially parallel position, not frictionally engaged with the hub of the upper member, and the arms of the yoke pass between the members of and are guided by the upper cotter pin 9.

While the trap is suspended by the line the upper member and the standard and base will drop by their own weight and the trap will assume the closed position shown in Fig. 4. When the trap reaches and rests upon the bottom and the line is slackened the lower member will slide downwardly, pulling the spring yoke therewith and thus opening the trap as shown in Fig. 3. When a shell fish pulls upon the bait the user pulls upwardly on the line, thus raising the lower member together with the bait holder and the spring yoke and closing the trap and catching the fish as in Fig. 4.

While I have herein shown and described a preferred form of my invention I would have it understood that changes may be made in the form, proportion and construction of the several parts, without departing from the spirit of my invention and within the scope of the appended claims.

Having thus described my invention, what I claim is:—

1. A convertible set trap and snag comprising a standard, upper and lower members arranged for vertical movement on the standard, means to lock either of said members against and release the other for such movement, a trigger carried by the lower member, means controlled by the trigger to hold the upper member in raised position when the device is used as a set trap, said means also serving to enable the lower member to be drawn upwardly and closed toward the upper member when the device is used as a snag.

2. A convertible set trap and snag comprising a standard, upper and lower members arranged for vertical movement on the standard, means to lock either of said members against and release the other for such movement, a trigger carried by the lower member, a yoke controlled by the trigger to initially hold the upper member in raised position when the device is used as a set trap, said yoke also serving for the attachment of a line thereto to enable the lower member to be drawn upward and closed toward the upper member when the device is used as a snag.

3. A convertible set trap and snag comprising a standard, upper and lower members arranged for vertical movement on the standard, means to lock either of said members against and release the other for such movement, a trigger carried by the lower member, a yoke having spring arms arranged to move outwardly, said yoke being slidably connected to the upper and lower members and adapted when engaged by the trigger to hold the upper member in raised position and to permit said upper member to drop when said yoke is released by the trigger, said yoke also serving for the attachment of a line thereto.

In testimony whereof I affix my signature.

OSCAR NELSON.